United States Patent
Dashevsky et al.

(10) Patent No.: US 12,079,209 B1
(45) Date of Patent: Sep. 3, 2024

(54) CHECKPOINTS MANAGEMENT BY A MEMORY CONTROLLER

(71) Applicant: Pliops Ltd., Tel Aviv (IL)

(72) Inventors: Shmuel Dashevsky, Ramat gan (IL); Moshe Twitto, Givat Shemuel (IL); Yuval Rochman, Ramat Gan (IL); Iddo Naiss, Neve Monoson (IL)

(73) Assignee: PLIOPS LTD., Tel Aviv (IL)

( * ) Notice: Subject to any disclaimer, the term of this patent is extended or adjusted under 35 U.S.C. 154(b) by 160 days.

(21) Appl. No.: 17/247,044

(22) Filed: Nov. 24, 2020

Related U.S. Application Data

(60) Provisional application No. 62/939,696, filed on Nov. 25, 2019.

(51) Int. Cl.
*G06F 16/24* (2019.01)
*G06F 16/21* (2019.01)
*G06F 16/242* (2019.01)
*G06F 16/2457* (2019.01)

(52) U.S. Cl.
CPC .......... *G06F 16/244* (2019.01); *G06F 16/219* (2019.01); *G06F 16/24573* (2019.01)

(58) Field of Classification Search
CPC . G06F 16/244; G06F 16/24573; G06F 16/219
See application file for complete search history.

(56) References Cited

U.S. PATENT DOCUMENTS

| | | | | |
|---|---|---|---|---|
| 7,516,361 B2 * | 4/2009 | Vick | .................... | G06F 11/1438 714/38.14 |
| 7,627,783 B2 * | 12/2009 | Archer | ................ | G06F 11/1438 714/15 |
| 9,720,619 B1 * | 8/2017 | Shah | ..................... | G06F 3/0619 |
| 2006/0294435 A1 * | 12/2006 | Vick | .................. | G06F 11/1438 714/E11.137 |
| 2008/0215916 A1 * | 9/2008 | Archer | ............... | G06F 11/1438 714/15 |

(Continued)

FOREIGN PATENT DOCUMENTS

WO WO2015110171 * 7/2015

OTHER PUBLICATIONS

Konstantopoulos et al., Distributed Personal Cloud Storage Without Third Parties. IEEE 2019.*

*Primary Examiner* — Daniel A Kuddus
(74) *Attorney, Agent, or Firm* — Reches Patents

(57) ABSTRACT

A method for managing multiple checkpoints stored in a memory unit, the method may include (a) managing a checkpoint tree, by a memory controller; the checkpoint tree comprises reference nodes and active nodes; wherein a reference node of the reference nodes holds a snapshot of a parent checkpoint taken at the time that a child checkpoint was created from the parent checkpoint; wherein an active node of the active nodes that is associated with the parent node stores changes to the parent checkpoint introduced after a creation of the active node; and wherein the parent checkpoint and the child checkpoint belong to multiple checkpoints stored in the checkpoint tree; (b) receiving access requests to access key value (KV) pairs of one or more checkpoints of the multiple checkpoints; and (c) responding to the access requests based, at least in part, on the checkpoint tree.

17 Claims, 6 Drawing Sheets

(56) References Cited

U.S. PATENT DOCUMENTS

| | | | |
|---|---|---|---|
| 2012/0079174 A1* | 3/2012 | Nellans | G11C 11/40615 |
| | | | 711/E12.008 |
| 2014/0244571 A1* | 8/2014 | Error | G06F 16/9535 |
| | | | 707/603 |
| 2016/0335278 A1* | 11/2016 | Tabaaloute | G06F 16/128 |
| 2017/0300248 A1* | 10/2017 | Purohit | G06F 3/0623 |
| 2019/0370113 A1* | 12/2019 | Zhao | G06F 9/545 |

* cited by examiner

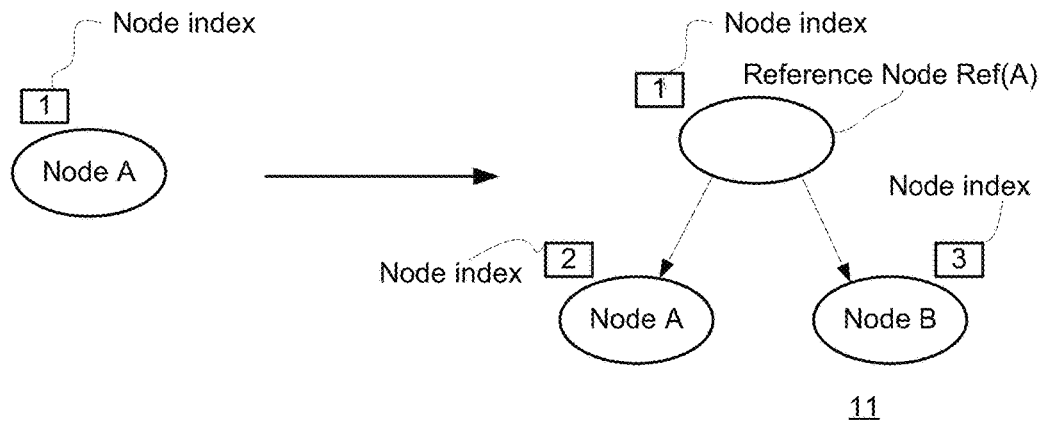
FIG. 4
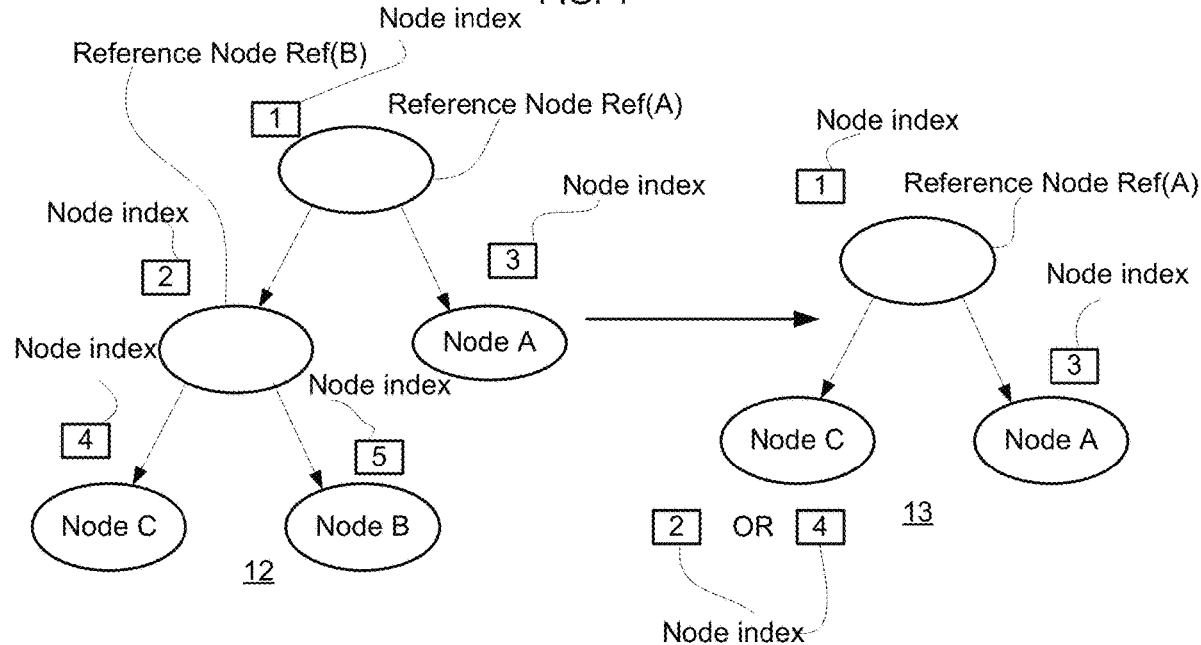
FIG. 5
| NODE INDEX | NODE NAME |
|---|---|
| 1 | ref(A) |
| 2 | ref(B) |
| 3 | A |
| 4 | C |
| 5 | B |
| 6 | Un-allocated |
| 7 | Un-allocated |
20
FIG. 6

ENCODE($S, n, k$):

1. If $k = 0$, return $\emptyset$.
  2. If $n \notin S$, return ENCODE($S, n - 1, k$).
  3. If $n \in S$, return $\binom{n-1}{k}$ + ENCODE($S, n - 1, k - 1$).

DECODE($x, n, k$):

1. If $k = 0$, return $\emptyset$.
  2. If $x < \binom{n-1}{k}$, return DECODE($x, n - 1, k$).
  3. If $x \geq \binom{n-1}{k}$, return DECODE($x - \binom{n-1}{k}, n - 1, k - 1$) $\cup \{n\}$.

FIG. 9

CHECKPOINTS MANAGEMENT BY A MEMORY CONTROLLER

CROSS REFERENCE

This application claims priority from U.S. provisional patent 62/939,696 filing date Nov. 25, 2019 which is incorporated herein by reference.

BACKGROUND

Checkpoints, also known as persistent snapshots, are a feature of great value to a storage system. It is traditionally managed in a software level above the storage device.

Software level management above the storage device is inefficient.

SUMMARY

There may be provide systems, memory units, methods and non-transitory computer readable medium for checkpoint management.

There may be provided a memory controller for managing checkpoints stored in a memory unit, the memory controller comprises multiple units (such as but not limited to a control circuit, an input circuit, an output circuit, an internal memory, and the like) that are configured to manage a checkpoint tree; the checkpoint tree comprises reference nodes and active nodes; wherein a reference node of the reference nodes holds a snapshot of a parent checkpoint taken at the time that a child checkpoint was created from the parent checkpoint; wherein an active node of the active nodes that is associated with the parent node stores changes to the parent checkpoint introduced after a creation of the active node; and wherein the parent checkpoint and the child checkpoint belong to multiple checkpoints stored in the checkpoint tree; receive access requests to access key value (KV) pairs of one or more checkpoints of the multiple checkpoints; and respond to the access requests based, at least in part, on the checkpoint tree

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1-8 illustrate various data structures;
FIG. 9 illustrates an example of decoding and encoding.

DETAILED DESCRIPTION OF THE DRAWINGS

Figure 1:
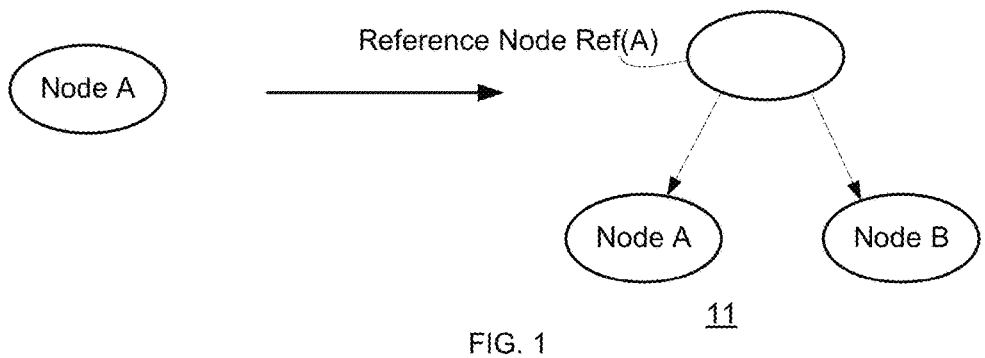

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

Some of the following examples will refer to a solid state drive (SSD) controller and an SSD memory unit. It should noted that this is merely an example—and that any reference to a SSD controller may be applied mutatis mutandis to any memory controller, and that any reference to a SSD memory unit may be applied mutatis mutandis to any memory unit.

A key-value (KV) pair may be an object of a memory management scheme. It includes a key that is paired with data (value).

The key may be the name of the data object or any type of unique identifier—that is unique in the memory management environment.

In the world of databases, a checkpoint means creating a copy of the database. The main challenge is to make a virtual copy, by a system of maps and pointers, avoiding duplication of all the objects. After a checkpoint is created both main version of the database and the checkpoint are regarded as separate databases.

A memory management scheme may support checkpoint related operations such as put (read object), get (read object), delete object, delete checkpoint and create checkpoint.

A checkpoint may be identified by a checkpoint identifier—that may be a checkpoint name. The checkpoint name may be defined by a host computer or other entity.

These checkpoint related commands may have the following formats:
  a. PUT OBJECT (key, value, key-size, data-size, checkpoint name).
  b. GET OBJECT (key, key-size, checkpoint name).
  c. DELETE OBJECT (key, key-size, checkpoint name).
  d. CREATE CHECKPOINT (source checkpoint name, new checkpoint name).
  e. DELETE CHECKPOINT (checkpoint name)—Deletes the checkpoint and all the objects in the system that are unique to this checkpoint As indicated above—every put and get operation is designated to a specific checkpoint.

When a checkpoint (child checkpoint) is created it shares all of it's KV pairs with its parent checkpoint.

As time passes new objects may be added to the child checkpoint, and some of the inherited objects may receive a new value (data may change). Thus, a chile checkpoint drifts from its parent checkpoint.

A specific key may have different values (data units that differ from each other) in different checkpoints, while it may be missing from other checkpoints.

The memory management scheme may be utilized by an SSD controller that is configured to control a SSD memory unit.

The checkpoint tree (CT) is a data structure that may store multiple checkpoints and may provide an indication about the relationships between the checkpoints.

The checkpoints tree may provide information about an order of inheritance between checkpoints.

The checkpoints tree has two type of nodes—reference nodes and active nodes. The leaves are active nodes and the inner nodes are reference nodes.

A reference node holds a snapshot of a checkpoint at the time that a child checkpoint was created from it. An active node holds all the changes to the patent checkpoint since the active node was created.

If all children of a reference node have an update to a given key (either new value or delete), then the reference node may delete this key.

A reference node should hold a snapshot of all K-V pairs that are needed to any of its children.

When CREATE CHECKPOINT (A, B) command arrives (A,B are names of two checkpointss), the following happens:
  a. Firstly, node A is renamed to ref(A). The term node "ref(A)" is a reference node which holds all the objects that were previously in node A.
  b. Secondly two new empty nodes are created: node A and node B.

This is described in FIG. 1—node A turns to checkpoint tree 11.

Figure 2:
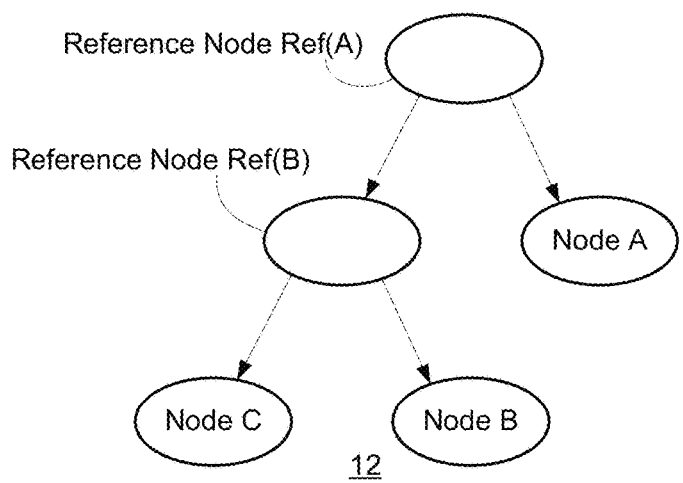

FIG. 2 illustrates an example of a checkpoints tree 12. In this example A is the original checkpoint. From it checkpoint B was created. Later checkpoint C was created from B. A is a parent node of checkpoint B. C is a child checkpoint of checkpoint B.

Figure 3:
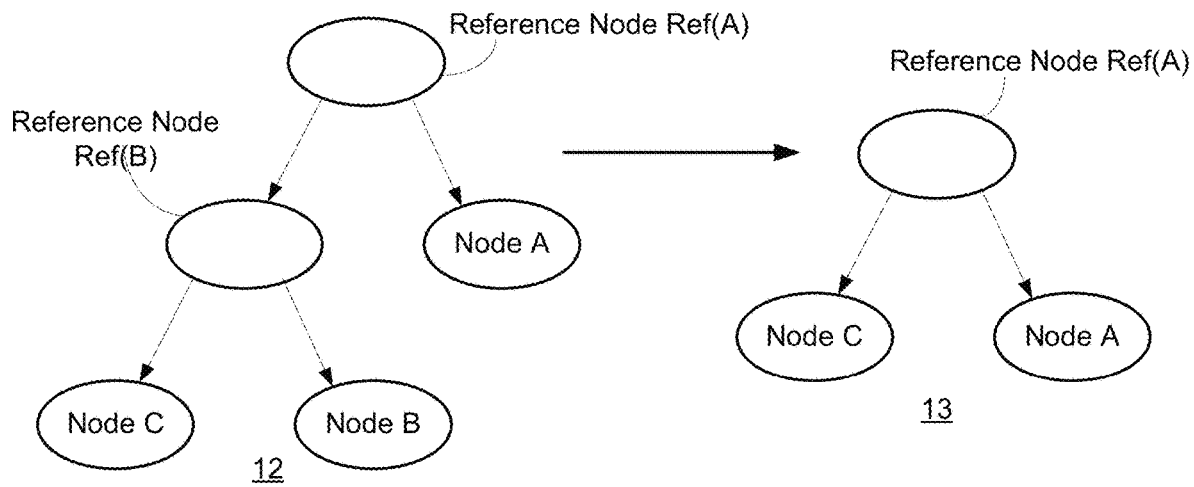

FIG. 3 illustrates that when a checkpoint is deleted, the parent reference node is merged with the remaining active node—checkpoint tree 12 becomes checkpoint tree 13.

Merging nodes means moving all objects from one node to the other, while resolving cases where both nodes hold the same key. In this process two nodes are removed. In the following illustration checkpoint B is deleted. The new node C is a result of merging old node C into old node ref(B).

Each node in the checkpoints tree is associated with a node index (NI). The mapping of nodes to NI is defined in the node index to node map (NI2N)—see for example table 20 of FIG. 6. The total number of nodes in the system may be limited, due to mapping size limitation.

An NI is a natural number always smaller than the maximum allowed number of nodes.

In FIG. 4 the NIs are marked beside the node. In FIG. 4 node A (NI=1) was replaced by adding a parent node (reference node) Ref(A), by making node A a child node and by adding chile node B to provide checkpoint tree 11. The NI of ref(A) is the NI of original node A (NI=1) while node A is assigned a child node NI (NI=2), and NI=3 is assigned to node B. The assignment of the NI of node A to the new parent node is efficient as the metadata (for example NI) related to the objects that once resided in node A and now resides in ref(A) remains unchanged.

FIG. 5 illustrates how the NI may change during insert and delete operations. The NI of unchanged nodes (NI=1 and NI=3) may remain the same.

Checkpoint tree 12 (including ref(A), ref(B), A, B and C) becomes (by deletion of B and ref(B)) checkpoint tree 13 (including ref(A), A, and C).

NI of node (C) that replaces a deleted parent node (Ref(B)) may remain unchanged (NI=4) or may be changed to the NI of the deleted parent node (NI=2). This is very effective as it minimizes changes to metadata.

Please note that at following a delete operation—node C may be either assigned with NI=2 or NI=4 while the NI of nodes ref(A) and A (not affected by the deletion operation) remain unchanged. The selection between the two optional values of Ni is done during the delete process, according to efficiency needs.

The same key may belong to different objects in different checkpoints. Each object belongs to a specific node. A checkpoint contains all the objects of its' active node and all the objects in the reference nodes which are the ancestors of the active node. If some key appears several times in these nodes, then the value in the node that is closest to the active node is the correct value. Each key may not repeat within a node.

There may be provided one or more data structures that list all the keys per checkpoint.

Even more convenient is to manage a list of keys per node.

Such a list may be stored in the SSD memory unit (due to its' large size). It is used for cleaning obsolete objects and for range operations.

There may be provided a main mapping that given a checkpoint identifier and a key could provide the SSM memory address of a KV pair that includes the key (and belongs to the checkpoint identified by the checkpoint identifier).

This main mapping may be stored in a RAM or other volatile memory, to keep get_object performance high. A copy may be stored in the SSD memory.

The main mapping may include one or more data structures—for example may include a single map for all the multiple checkpoints.

In case of a traditional block device it is the L2P map. In case of a key-value SSD it is the key to SSD memory address map (main dispersive hash).

The main map may provide one or more SSD memory address per key. The main map should also keep the NI (node index) of each such object.

The main map may be provided in a compressed or uncompressed versions.

The main map—in an uncompressed version—may include per each key:
  List of node indexes—a bit per NI that is set for each NI that has an object of this key and reset for all other Nis. This list tells us which Nis have versions for the given key.
  List of SSD memory addresses—The number of elements in this list is equal to the number of set bits in the list of node indexes. Each element holds the address on SSD memory for the corresponding object. The elements are ordered by the NI value.

The main map—in a compressed version—may include per each key:
  Number of objects—Compressed by unary encoding.

Compressed list of node indexes—This list tells us which NIs have versions for the given key. A possible compression algorithm is the combinatorial number system (described in FIG. 9).

List of SSD memory addresses—The number of elements in this list is equal to the number of set bits in the list of node indexes. Each element holds the address on SSD memory for the corresponding object. The elements are ordered by the NI value.

GET OBJECT Command

Input: Key, Checkpoint

The key is searched in the main map. If it's absent—return not-exist.

The main map entry corresponding to the key is parsed.

The parsing is done according to the location of the checkpoint on the checkpoints tree.

The parsing is done bottom-up along the checkpoints tree (from leaves towards root). It starts from the active node associated with the checkpoint specified at the get command. The parsing continues along the ancestor until it reaches the root of the checkpoints tree. Once the parsing reaches a node that is marked in the list of node indexes—the parsing stops and the corresponding SSD memory address is used to fetch the data. If reached root node and still not found a marked node—return not-exist.

PUT OBJECT Command

Input: Key, Value, Checkpoint

Object is written to SSD memory.

Main map entry corresponding to the key is read. If active node of the checkpoint is present in the list of NIs—then it is a rewrite; simply replace the old SSD memory address with the new one.

Else, add the NI of the checkpoints' active node to the list of NIs, and add the new SSD memory address to the list of SSD memory addresses.

Check if some version of this key can be deleted (a version can be deleted from a reference node if on the path to each one of its' leaves there is another version).

DELETE OBJECT Command

Input: Key, Checkpoint

The key is searched in the main map. If it's absent—return.

The main map entry corresponding to the key is parsed.

The parsing is done according to the location of the checkpoint on the checkpoints tree.

The parsing is done bottom-up along the checkpoints tree (from leaves towards root). It starts from the active node associated with the checkpoint specified at the get command.

If the key is present in the active node of the checkpoint—mark its' SSD memory address as invalid and remove from map.

If any ancestor node has another version of the key, a tombstone entry is added to the active node. The tombstone marks that for the current checkpoint this key is deleted (and disregard version in ancestor reference nodes)

Now a cleaning may be performed. Check if some version of this key can be deleted (a version can be deleted from a reference node if on the path to each one of its' leaves there is another version). Then check for tombstones that can be removed (a tombstone can be removed if all of the ancestors of its' node don't have a version for the key).

CREATE CHECKPOINT Command

Input: Origin Checkpoint, New Checkpoint

The number of checkpoints is limited to avoid map size overflow (due to expansion of the list of NIs). When a create checkpoint request arrives first check that the limit is not exceeded.

Allocate two NIs—first is a new NI for the origin checkpoint, second for the new checkpoint The original NI of origin checkpoint is remapped to be a reference node.

The NI2N map is updated accordingly.

DELETC CHECKPOINT Command

Input: Checkpoint

Three nodes participate in the deletion process: deleted checkpoint, parent of deleted checkpoint, brother of deleted checkpoint (the other child of the parent of the deleted checkpoint). We will call them: Del, Ref and Bro nodes.

To recognize the objects that belong to each node we will read the node to object map. (an alternative is to scan the whole main map)

All the objects that belong to Del node are marked as invalid and removed from the main map. Then Del node is marked as unallocated in the NI2N map.

There are two options—to migrate objects from Ref node to Bro node, or migrate from Bro to Ref. The node with less objects is the one that should migrate. For simplicity of explanation assume that objects are migrated from Bro to Ref.

All objects that belong to either Bro or Ref node are parsed.

If it belongs only to Ref—do nothing

If it belongs only to Bro—remap it to Ref (a change in the NI list in the main map)

If it belongs to both—mark the object in Ref as invalid. Remap the object in Bro to Ref. If only a tombstone object is left, and no ancestor has a version of the same key, remove the tombstone from the main map.

This application provides a significant technical improvement over the prior art—especially an improvement in computer science.

Figure 7:
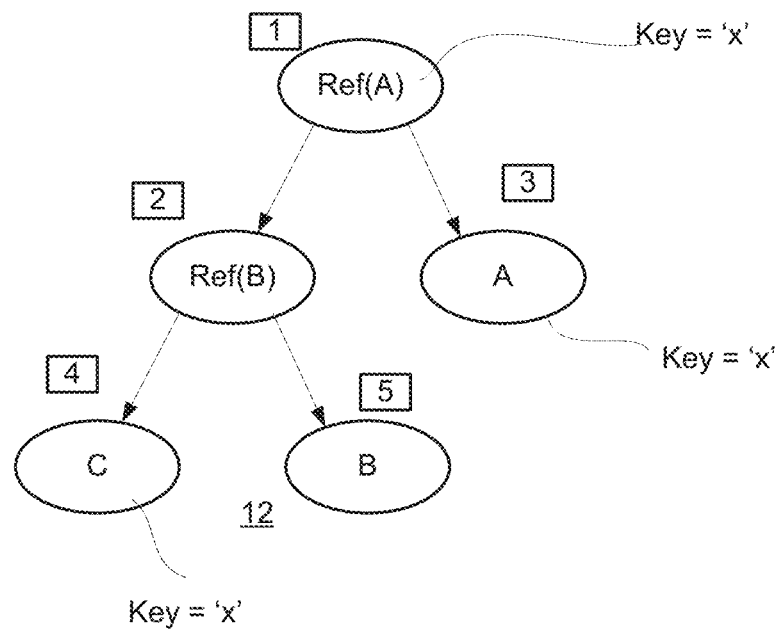
Figure 8:
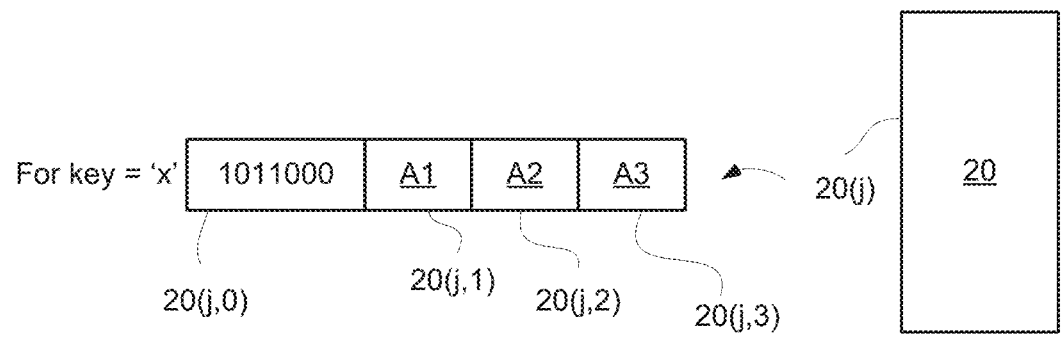
Figure 8:
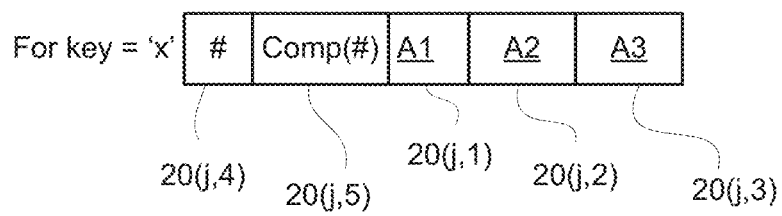

FIG. 7 illustrates example of a main map 20 (also referred to as a first map) and especially an entry of the main may that represents the locations of a key that equals 'x'. The locations of the key are illustrate din FIG. 7—it appears in nodes ref(A) (NI=1), A (NI=3) and C (NI=4).

An entry (20(j)) for a key (k='x') may include a bitmap 20(j,0), and SSD addresses (A1, A2, A3—in fields 20(j,1), 20(j,2) and 20(j,3)) of the KV that include the key in nodes ref(A), A and C.

Yet for another example of that entry—in a compressed form—the bitmap is replaced by (i) a number of relevant nodes (in this case 3), and (ii) a compressed representation of identifiers (in this case 1m 3 and 4) of the at least one relevant node.

FIG. 9 illustrates a device that include SSD controller 31 and one or more SSD memory units 32. The SSD controller may include CPU 39, hardware accelerator 28 and volatile memory unit 37.

Figure 10:
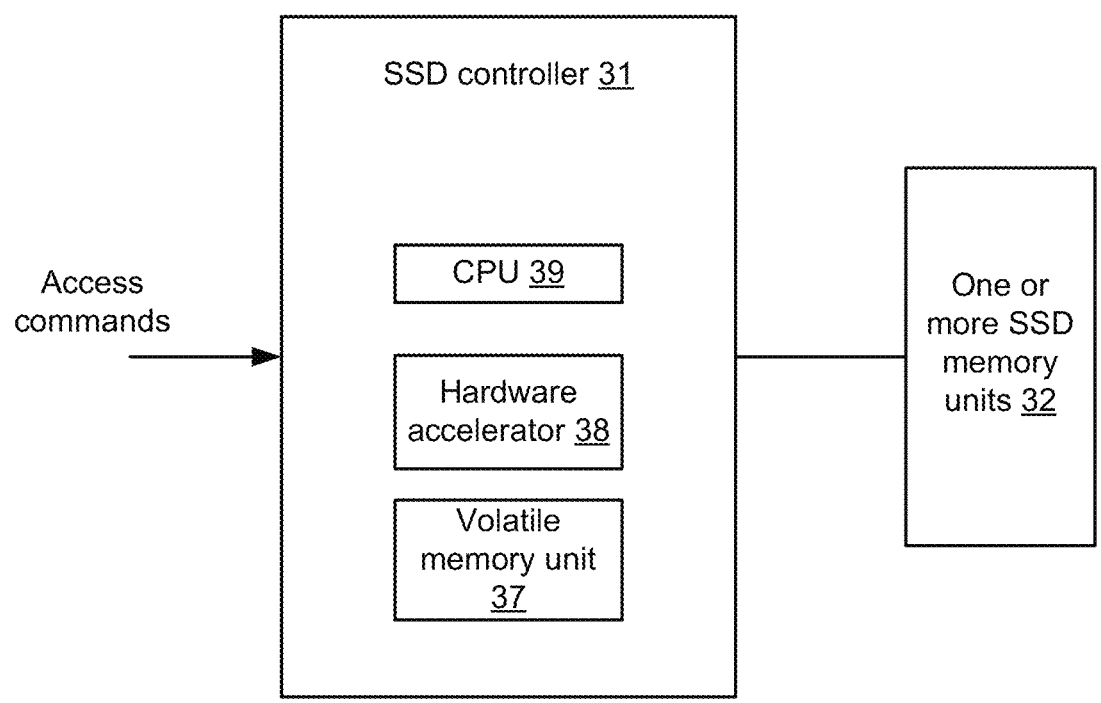
FIG. 10 illustrates an example of a device.
Figure 11:
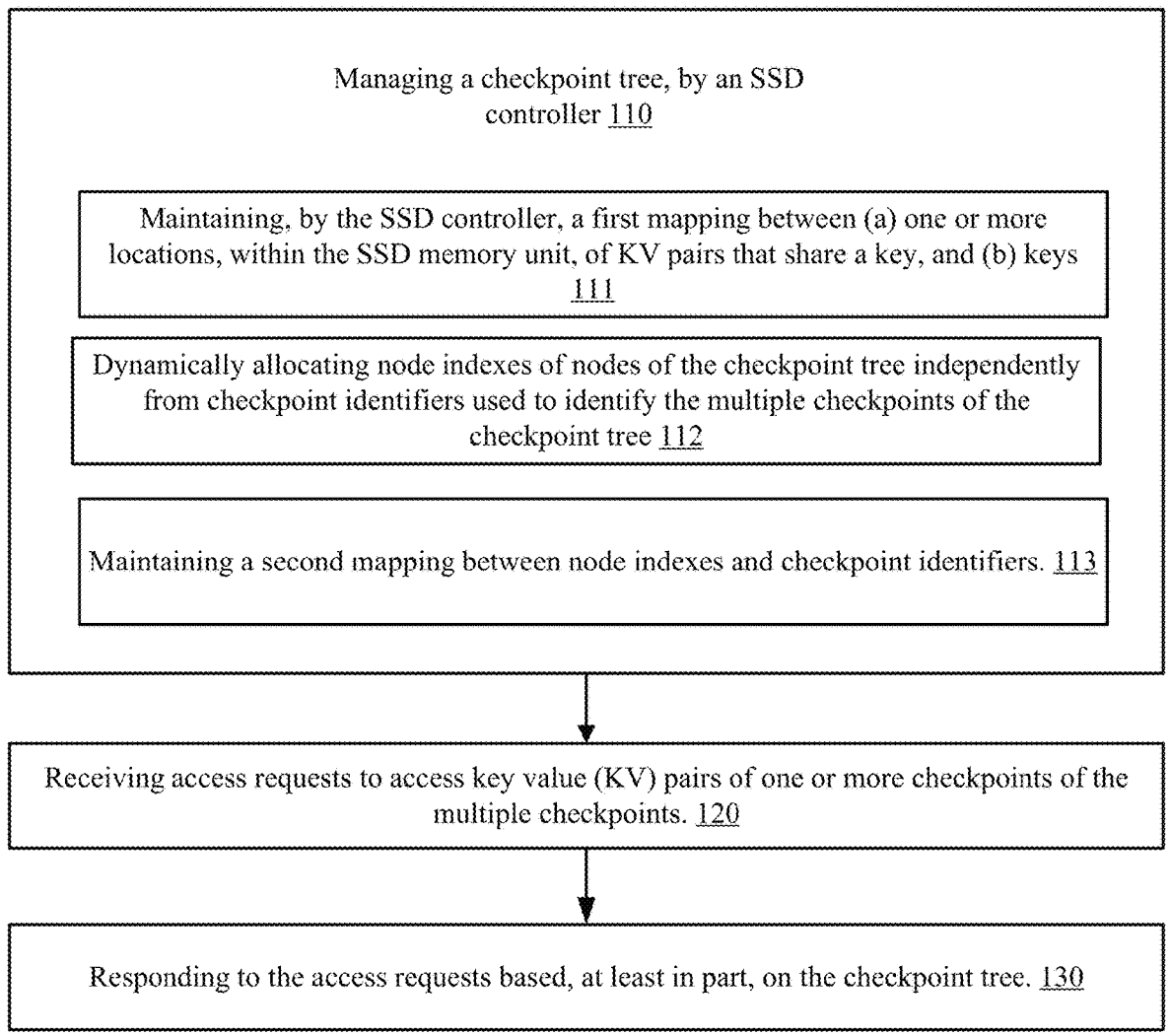
FIG. 11 illustrates an example of a method.

FIG. 10 illustrates method 100 for managing multiple checkpoints stored in a solid state drive (SSD) memory unit.

Method 100 may include step 110 of managing a checkpoint tree, by an SSD controller.

Method 100 may also include step 120 of receiving access requests to access key value (KV) pairs of one or more checkpoints of the multiple checkpoints.

Step 120 may be followed by step 130 of responding to the access requests based, at least in part, on the checkpoint tree.

The managing may be responsive to the outcome of step 130—especially when the access requests are write access requests.

Regarding step 110—the checkpoint tree may include reference nodes and active nodes. A reference node of the reference nodes holds a snapshot of a parent checkpoint taken at the time that a child checkpoint was created from the parent checkpoint. an active node of the active nodes that is associated with the parent node stores changes to the parent checkpoint introduced after a creation of the active node. The parent checkpoint and the child checkpoint belong to multiple checkpoints stored in the checkpoint tree.

Step 110 may include step 111 of maintaining, by the SSD controller, a first mapping between (a) one or more locations, within the SSD memory unit, of KV pairs that share a key, and (b) keys.

An entry of the first mapping is allocated for a certain key and may include (a) a key node metadata about at least one relevant node of the checkpoint tree that includes at least one KV pair of the certain key, and (b) an SSD memory address of each KV pair of each relevant node.

A key node metadata is a bit map that may include bit per node of the checkpoint tree.

A key node metadata is in a compressed format.

The key node metadata may include (i) a number of the at least one relevant nodes, and (ii) a compressed representation of identifiers of the at least one relevant node.

The compressed representation identifiers may be compressed using a combinatorial compression method.

Step 120 may include receiving a certain access request with the certain key.

In this case step 130 may include responding to the certain access request by:
 a. Accessing the certain entry of the main mapping.
 b. Obtaining the key node metadata of the certain entry.
 c. Responding to the relevant node metadata.

The responding to the relevant node metadata may include
 a. Checking whether the key node metadata is indicative of a plurality of relevant nodes;
 b. Applying a selection rule to select a selected node out of the plurality of the relevant nodes.
 c. Accessing a KV pair having the certain key of the selected node of the checkpoint tree.

Step 110 may include step 112 of dynamically allocating node indexes of nodes of the checkpoint tree independently from checkpoint identifiers used to identify the multiple checkpoints of the checkpoint tree. See, for example FIGS. 4 and 5.

The dynamically allocating may follow a merge of some of the multiple checkpoints or a deletion of one of the multiple checkpoints.

This may include, for example: amending the checkpoint tree by (a) replacing a node (node A of FIG. 4) having a certain index node (NI=1) by a reference node (ref(A) of FIG. 4), and (b) turning the node (A) to an active node; and assigning the certain index node (NI=1) to the reference node (ref(A)).

Thus may include, for example amending the checkpoint tree by (a) deleting a reference node (node ref(B) of FIG. 5 having a certain index node (NI=2), and (b) replacing the deleted reference node by an active node (node C of FIG. 5) that was linked to the reference node; and assigning the certain index node (NI=4) to the active node—or maintaining the index node (NI=4) of the active node.

Step 110 may include step 113 of maintaining a second mapping between node indexes and checkpoint identifiers. See, for example NI2N map.

Any reference to the term "comprising" or "having" should be interpreted also as referring to "consisting" of "essentially consisting of". For example
 a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing multiple checkpoints stored in a solid state drive (SSD) memory unit, the method comprises:
   managing a checkpoint tree, by an SSD controller;
      the checkpoint tree comprises reference nodes and active nodes; wherein the active nodes are leaf nodes of the checkpoint tree and the active nodes are inner nodes of the checkpoint tree;
      wherein a reference node of the reference nodes holds a snapshot of a parent checkpoint taken at the time that a child checkpoint was created from the parent checkpoint;
      wherein an active node of the active nodes that is associated with the parent node stores changes to the parent checkpoint introduced after a creation of the active node; and
      wherein the parent checkpoint and the child checkpoint belong to multiple checkpoints stored in the checkpoint tree;
   receiving access requests to access key value (KV) pairs of one or more checkpoints of the multiple checkpoints;
   responding to the access requests based, at least in part, on the checkpoint tree;
   amending the checkpoint tree by (a) deleting a reference node having an index node, and (b) replacing the deleted reference node by an active node that was linked to the reference node; and
   assigning the index node to the active node.

2. The method according to claim 1 comprising maintaining, by the SSD controller, a first mapping between (a) one or more locations, within the SSD memory unit, of KV pairs that share a key, and (b) keys.

3. The method according to claim 2 wherein an entry of the first mapping is allocated for a key and comprises (a) a key node metadata about at least one relevant node of the checkpoint tree that includes at least one KV pair of the key, and (b) an SSD memory address of each KV pair of each relevant node.

4. The method according to claim 3 wherein the key node metadata is a bit map that comprises bit per node of the checkpoint tree.

5. The method according to claim 3 wherein the key node metadata is in a compressed format.

6. The method according to claim 5 wherein the key node metadata comprises (i) a number of the at least one relevant nodes, and (ii) a compressed representation of identifiers of the at least one relevant node.

7. The method according to claim 6 wherein the compressed representation identifiers are compressed using a combinatorial compression method.

8. The method according to claim 3 comprising:
receiving an access request with the key; and
wherein a responding to the access request comprises:
accessing the entry of the first mapping that is allocated to the key;
obtaining the key node metadata of the entry; and
responding to the relevant node metadata.

9. The method according to claim 8 wherein the responding to the relevant node metadata comprises:
checking whether the key node metadata is indicative of a plurality of relevant nodes;
applying a selection rule to select a selected node out of the plurality of the relevant nodes; and
accessing a KV pair having the key of the selected node of the checkpoint tree.

10. The method according to claim 1 comprising dynamically allocating node indexes of nodes of the checkpoint tree independently from checkpoint identifiers used to identify the multiple checkpoints of the checkpoint tree.

11. The method according to claim 10 wherein the dynamically allocating follows a merge of some of the multiple checkpoints or a deletion of one of the multiple checkpoints.

12. The method according to claim 1 comprising:
amending the checkpoint tree by (a) replacing a node having a certain index node by a reference node, and (b) turning the node to an active node; and
assigning the certain index node to the reference node.

13. The method according to claim 1 comprising updating or deleting a given key of a given reference node following a corresponding updating or deleting of the given key in all child nodes of the given reference node.

14. The method according to claim 1 comprising maintaining a second mapping between node indexes and checkpoint identifiers.

15. The method according to claim 1 wherein the memory unit is a solid state drive (SSD) memory unit and the memory controller is an SSD memory controller.

16. A non-transitory computer readable medium for managing multiple checkpoints stored in a solid state drive (SSD) memory unit, the non-transitory computer readable medium stores instructions for:
managing a checkpoint tree, by an SSD controller;
the checkpoint tree comprises reference nodes and active nodes;
wherein the active nodes are leaf nodes of the checkpoint tree and the active nodes are inner nodes of the checkpoint tree;
wherein a reference node of the reference nodes holds a snapshot of a parent checkpoint taken at the time that a child checkpoint was created from the parent checkpoint;
wherein an active node of the active nodes that is associated with the parent node stores changes to the parent checkpoint introduced after a creation of the active node; and
wherein the parent checkpoint and the child checkpoint belong to multiple checkpoints stored in the checkpoint tree;
receiving access requests to access key value (KV) pairs of one or more checkpoints of the multiple checkpoints;
responding to the access requests based, at least in part, on the checkpoint tree;
amending the checkpoint tree by (a) deleting a reference node having an index node, and (b) replacing the deleted reference node by an active node that was linked to the reference node; and
assigning the index node to the active node.

17. A solid state device (SSD) memory controller for managing checkpoints stored in a SSD memory unit, the SSD memory controller is an integrated circuit and is configured to:
(i) manage a checkpoint tree; the checkpoint tree comprises reference nodes and active nodes;
wherein the active nodes are leaf nodes of the checkpoint tree and the active nodes are inner nodes of the checkpoint tree;
wherein a reference node of the reference nodes holds a snapshot of a parent checkpoint taken at the time that a child checkpoint was created from the parent checkpoint;
wherein an active node of the active nodes that is associated with the parent node stores changes to the parent checkpoint introduced after a creation of the active node; and
wherein the parent checkpoint and the child checkpoint belong to multiple checkpoints stored in the checkpoint tree;
(ii) receive access requests to access key value (KV) pairs of one or more checkpoints of the multiple checkpoints;
(iii) respond to the access requests based, at least in part, on the checkpoint tree;
(iv) amend the checkpoint tree by (a) deleting a reference node having an index node, and (b) replacing the deleted reference node by an active node that was linked to the reference node; and
(v) assign the index node to the active node.

\* \* \* \* \*